United States Patent [19]

Steels

[11] 4,089,438
[45] May 16, 1978

[54] APPARATUS FOR MOLDING CONFECTIONERY HAVING HEAT-DISSIPATING NOZZLE

[75] Inventor: Gordon Steels, Peterborough, England

[73] Assignee: Baker Perkins Holdings Limited, United Kingdom

[21] Appl. No.: 783,950

[22] Filed: Apr. 1, 1977

[30] Foreign Application Priority Data

Apr. 14, 1976 United Kingdom ............... 15290/76

[51] Int. Cl.² .............................................. B67D 5/62
[52] U.S. Cl. ............................. 222/146 C; 222/146 R; 425/549
[58] Field of Search ............... 425/549, 378, 379, 134; 222/146 R, 146 C, 135, 137, 145, 330

[56] References Cited

U.S. PATENT DOCUMENTS

| | | | |
|---|---|---|---|
| 798,251 | 8/1905 | Averay-Jones | 222/146 X |
| 2,115,799 | 5/1938 | Brandt | 222/330 |
| 2,658,237 | 11/1953 | Cuppett et al. | 425/549 X |
| 3,213,903 | 10/1965 | Armstrong | 222/146 C X |
| 4,004,716 | 1/1977 | Steels | 222/145 |

*Primary Examiner*—Robert B. Reeves
*Assistant Examiner*—David A. Scherbel
*Attorney, Agent, or Firm*—Watson, Cole, Grindle & Watson

[57] ABSTRACT

A depositor for effecting simultaneous deposition of two different confectionery materials into a mold beneath it to form in the mold a deposit consisting of a center surrounded by shell material, the depositor comprising separate hoppers disposed out of contact with one another and serving respectively for the reception of the two materials, an independently controllable heater associated with each hopper, conduits extending from the hoppers to a nozzle assembly constituted by coaxially disposed inner and outer nozzles disposed beneath the hoppers, and pumping mechanism for discharging material from one hopper through one conduit to the inner nozzle and from the other hopper through the other conduit to the outer nozzle, the inner nozzle being thermally insulated from the surrounding components and having an upper portion which extends above the nozzle assembly to provide a heat-dissipating surface.

9 Claims, 3 Drawing Figures

APPARATUS FOR MOLDING CONFECTIONERY HAVING HEAT-DISSIPATING NOZZLE

BACKGROUND OF THE INVENTION

In my U.S. application Ser. No. 606,093, filed Aug. 20, 1975, now U.S. Pat. No. 4,004,716 of Jan. 25, 1977, I have described and claimed a depositor for effecting simultaneous deposition of two different confectionery materials into a mold beneath it, the depositor comprising separate hoppers disposed out of contact with one another for the reception of the two materials, an independently controllable heater associated with each hopper, conduits extending from the hoppers to coaxially disposed inner and outer nozzles disposed beneath the hoppers, pumping mechanism for discharging material from one hopper through one conduit to the inner nozzle and from the other hopper through the other conduit to the outer nozzle, and a pad of thermal insulation disposed between the two conduits immediately above the coaxially disposed nozzles.

This depositor is primarily intended for depositing hard candy through the outer nozzle and a softer filling through the inner nozzle and the purpose of using separate hoppers, each with an independently controllable heater, for the different confectionery materials is to enable each material to be deposited at the temperature appropriate for it.

The purpose of the pad of thermal insulation is to reduce passage of heat by conduction from the material flowing through the outer nozzle to that flowing through the inner nozzle and so to minimize the risk of the material constituting the center of the deposit being subsequently raised to boiling point and bursting through the shell.

In the depositor specifically described and illustrated in the noted patent, the inner nozzle is a downward extension of the barrel of the pump by which the center-forming material is discharged into the mold and the thermal insulation is constituted by a disc of material disposed between the lower end of the barrel and the nozzle assembly. Such insulation prevents heat being conducted to the center material in the hopper but is ineffective to prevent heat from passing by conduction, through the wall of the inner nozzle, from the material flowing through the surrounding outer nozzle to that flowing through the inner nozzle.

When such a depositor is used to deposit hard candy with a filling of jam or other water-based material, the conditions of operation are especially critical. The hard candy is deposited at a temperature of approximately 140° C, while the jam cannot be deposited at a temperature lower than about 55° C, because otherwise it will not flow satisfactorily. When, as a typical case, the shell of hard candy constitutes two thirds of the volume of the deposit and the filling of jam the remaining third, the temperature at the interface between the shell and the filling is 111° C when the above depositing temperatures are used. The boiling temperature of the jam is, however, 115° C.

The depositor is accordingly operating under conditions very close to the safety limit. There is accordingly a risk of boiling of the filling at the interface with the shell should, for example, the boiling point of the jam be reduced as a result of change in the recipe. More seriously, there is a tendency for the temperature of deposit of the jam to rise after the depositor has been in continuous operation for a sufficient time due to conduction of heat to the jam through the wall of the inner nozzle as it flows through the inner nozzle, from the candy flowing past the outer wall of the inner nozzle, causing the interface temperature to exceed the boiling point of the jam.

SUMMARY OF THE INVENTION

With a view to avoiding this difficulty, the invention provides a depositor for effecting simultaneous deposition of two different confectionery materials into a mold beneath it to form in the mold a deposit consisting of a centre surrounded by shell material, the depositor comprising separate hoppers disposed out of contact with one another and serving respectively for the reception of the two materials, an independently controllable heater associated with each hopper, conduits extending from the hoppers to a nozzle assembly constituted by coaxially disposed inner and outer nozzles disposed beneath the hoppers, and pumping mechanism for discharging material from one hopper through one conduit to the inner nozzle and from the other hopper through the other conduit to the outer nozzle, the inner nozzle being thermally insulated from the surrounding components and having an upper portion which extends above the nozzle assembly to provide a heat-dissipating surface.

Preferably the upper portion of the inner nozzle is finned to assist in dissipation of heat therefrom. It may extend into the ambient atmosphere above the nozzle assembly and means may be provided for directing a jet of compressed cooling air thereon. Alternatively, it may be surrounded by a water cooling jacket.

BRIEF DESCRIPTION OF THE DRAWINGS

Certain embodiments of the invention will now be described in detail, by way of example, with reference to the accompanying diagrammatic drawings, in which.

DESCRIPTION OF THE PREFERRED EMBODIMENTS

Figure 1:
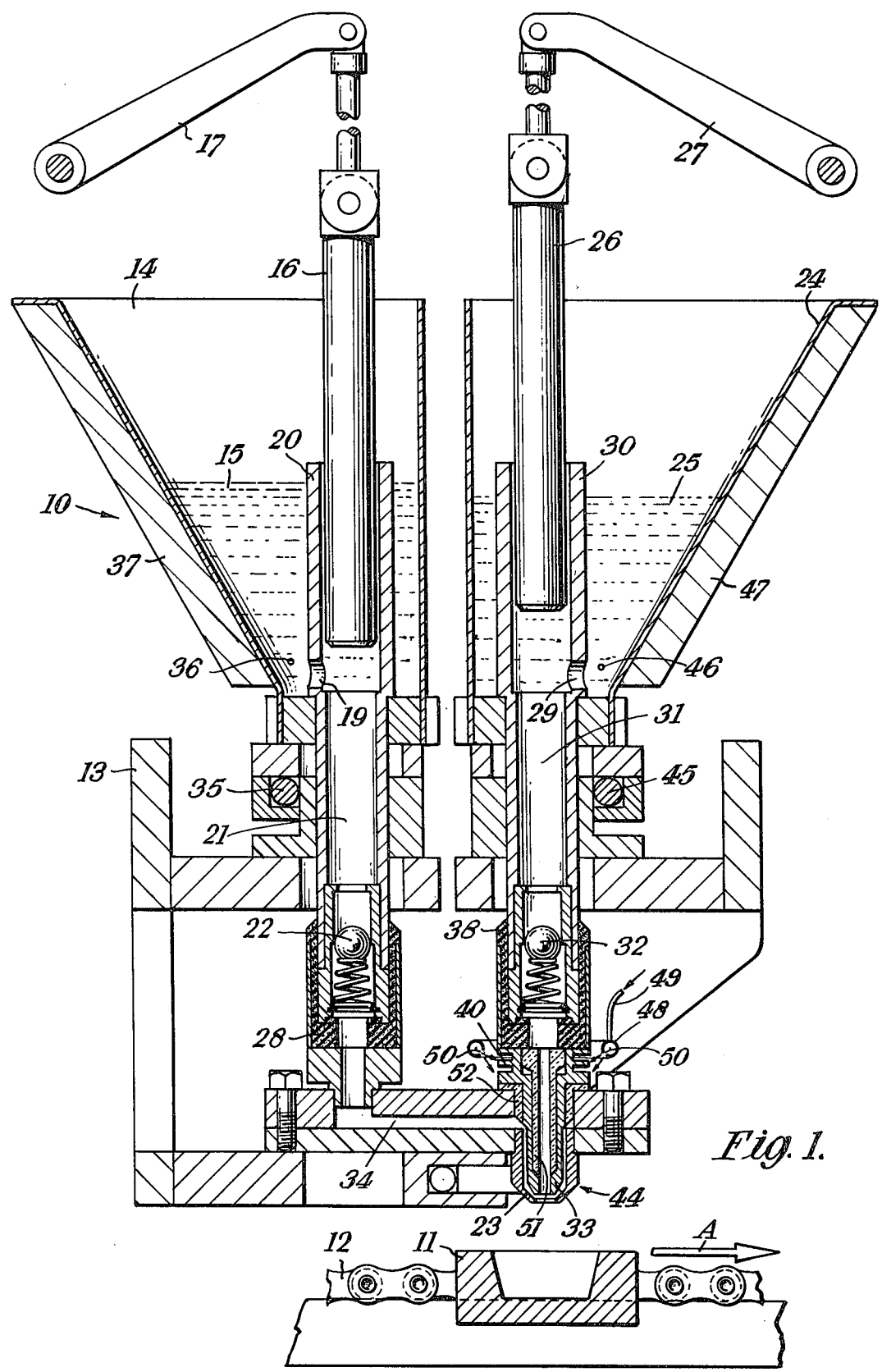
FIG. 1 is a vertical section through a depositor according to the invention.

The depositor 10 shown in FIG. 1 is disposed above a procession of molds 11 which are advanced by a pair of chains 12, one only of which is illustrated, in the direction of the arrow A. The depositor 10 is supported on a frame 13 which is reciprocated in the direction of the arrow A, by means not shown, to cause the depositor to advance at the same speed as the molds during a depositing stroke in which it deposits shell and center materials into the mold beneath it as described below, followed by a rapid return stroke in the opposite direction into position above the next succeeding mold. A typical conventional moving head depositor is described in British Pat. No. 405,374.

The depositor 10 includes two completely separated hoppers 14, 24 mounted on the frame 13 and respectively containing shell-forming material 15 and center forming material 25. The hoppers 14, 24 respectively contain independently operated plungers 16, 26 which serve, as described below, to deposit the materials 15 and 25 into the mold 11 during the depositing stroke. The plungers 16, 26 are reciprocated by respective cam operated levers 17, 27.

In the upper position shown in FIG. 1, the plungers 16, 26 clear ports 19, 29 in respective sleeves 20, 30 to allow cavities 21, 31 in the sleeves to fill with material from their respective hoppers.

During the upward movement of the plungers 16 and 26 to the position shown in FIG. 1, spring-loaded ball valves 22 and 32 close on their respective seats and cause a vacuum to be created in the cavities 21 and 22 which assists them to fill up with material when the plungers clear the inlet ports 19 and 29.

When the plungers move down, material is discharged through the inlet ports 19 and 29 into the hoppers 14 and 24 until these ports are covered by the plungers and the ball valves 22 and 32 are then forced off their seats by the pressure exerted by the plungers and the material passes through to the nozzle assembly 44 beneath the hoppers.

The nozzle assembly includes coaxially disposed inner and outer nozzles 33 and 23 respectively. The inner nozzle 33 is disposed directly beneath the plunger 26 and receives center material from the hopper 24 through a conduit extending through the sleeve 30 and including the valve 32. The outer nozzle 23 is offset from the plunger 16 and receives shell material from the hopper 14 through the conduit, which extends through the sleeve 20 and includes the valve 22 and a channel 34 in the nozzle assembly.

The bases of the hoppers 14 and 24 are heated by independent heating pads 35 and 45 which are controlled by temperature sensors 36 and 46. The walls of the hoppers are also heated by jackets 37 and 47 which are maintained at the appropriate temperatures for the materials contained in the hoppers. Heating can be by electrical pad heaters, steam or water jackets, oil jackets or any form of heating which can be controlled.

The plungers 16, 26 are timed to operate, as described in the aforesaid U.S. Patent, so that shell material 15 is first delivered to the cavity in the mold 11 by the plunger 16 through the outer nozzle 23, shell and center materials are then delivered simultaneously through the two nozzles so that a filling of the centre material is introduced into the deposit made in the mold, and finally shell material only is delivered so that the center material in the deposit is completely enveloped in shell material.

The nozzle assembly 44 is thermally insulated from the hoppers 14, 24 by cups 28, 38 of silicone rubber. The inner nozzle 33, which is made of copper or steel, has a finned portion 40 which extends upwardly from the nozzle assembly 44 into the ambient atmosphere. Compressed air, introduced into a ring 48 through an inlet 49, emerges as jets through outlets 50 to provide air cooling for the finned portion 40. The nozzle 33 contains a lining sleeve 51 of material having a low heat conductivity and the finned portion 40 of the nozzle is thermally insulated by a bush 52 from the nozzle assembly 44.

Owing to the heat dissipation afforded by the air cooling of the finned portion 40, the depositor can be utilized to deposit jam filled hard candy over prolonged periods without risk of boiling of the filling.

Figure 2:
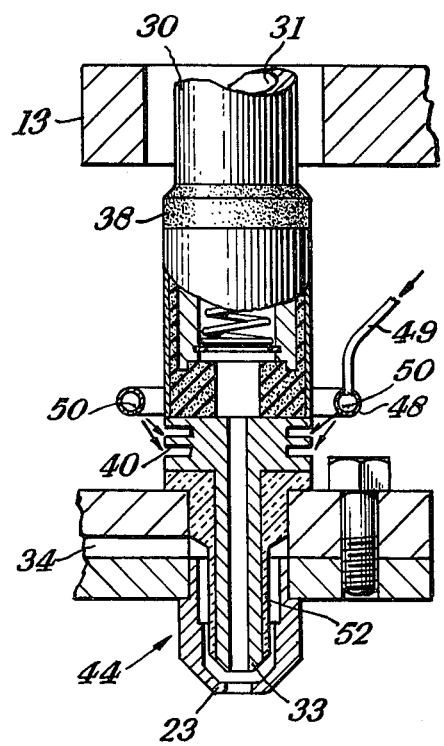
FIGS. 2 and 3 are respectively sectional views showing alternative forms of nozzle assembly.

In the embodiment shown in FIG. 2, there is no lining sleeve in the nozzle 33, but the bush 52 is extended downwardly to surround the portion of the nozzle 33 disposed within the outer nozzle 23.

Figure 3:
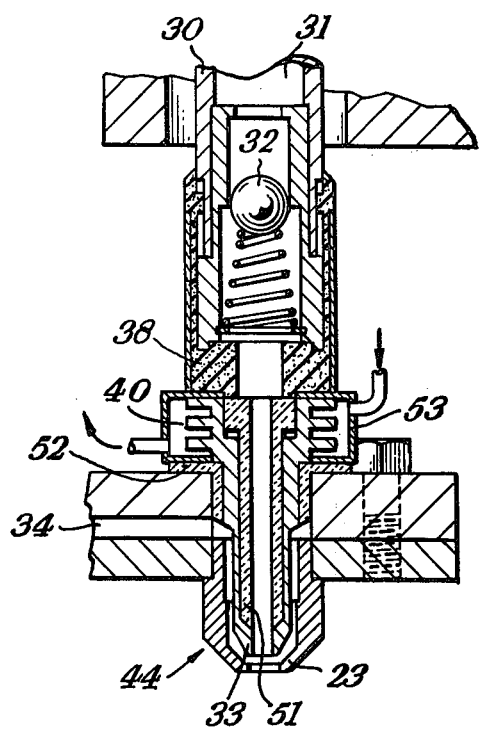

The embodiment shown in FIG. 3 differs from that of FIG. 1 in that a water cooling jacket 53 is used in place of air cooling for cooling the finned portion of the inner nozzle.

What I claim as my invention and desire to secure by Letters Patent is:

1. In a dispenser for effecting simultaneous deposition of first and second confectionery materials into a mold arranged beneath said dispenser so as to form in the mold a deposit having a shell of the first material surrounding a filling of the second material, said dispenser comprising:
   a first hopper for containing the first material;
   a second hopper for containing the second material, said second hopper being physically separated from said first hopper;
   a first heater for heating the first material in said first hopper;
   a second heater for heating the second material in said second hopper, said second heater being independent from said first heater;
   a nozzle assembly arranged beneath said hoppers, said nozzle assembly including an inner nozzle and an annular outer nozzle surrounding said inner nozzle;
   a first conduit connecting said outer nozzle to said first hopper;
   a second conduit connecting said inner nozzle to said second hopper, said second conduit being separate from said first conduit;
   a first plunger mounted for reciprocating movement in said first hopper for causing discharge of the first material from said first hopper through said first conduit to said outer nozzle; and
   a second plunger mounted for reciprocating movement in said second hopper for causing discharge of the second material from said second hopper through said second conduit to said inner nozzle;
   said first plunger commencing discharge of the first material before said second plunger has commenced discharge of the first material after said second plunger has terminated discharge of the second material;
   the improvement wherein said inner nozzle has an upper portion which projects upwardly from said nozzle assembly to provide a heat dissipating surface and wherein thermal insulation is associated with the portion of said inner nozzle beneath said heat dissipating upper portion.

2. A depositor according to claim 1, wherein said heat dissipating upper portion of the inner nozzle is finned.

3. A depositor according to claim 1, wherein said heat dissipating upper portion of the inner nozzle is exposed to the ambient atmosphere.

4. A depositor according to claim 1, which includes means for directing a jet of compressed cooling air onto said heat dissipating upper portion of the inner nozzle.

5. A depositor according to claim 1, which includes a water cooling jacket surrounding said heat dissipating upper portion of the inner nozzle.

6. A depositor according to claim 1, wherein the inner nozzle is made of copper.

7. A depositor according to claim 1, wherein said thermal insulation is a lining sleeve of low thermal conductivity within the inner nozzle.

8. A depositor according to claim 1, wherein said thermal insulation is a bush of thermally insulating material disposed around the inner nozzle beneath the upper portion thereof.

9. A depositor according to claim 8, in which the bush surrounds the portion of the inner nozzle disposed within the outer nozzle.

* * * * *